US006786401B2

(12) United States Patent
Kimoto et al.

(10) Patent No.: US 6,786,401 B2
(45) Date of Patent: Sep. 7, 2004

(54) PASSING EXAMINATION SYSTEM & PASSING EXAMINATION METHOD

(75) Inventors: Katsumi Kimoto, Kanagawa-ken (JP); Atsushi Murakami, Kanagawa-ken (JP); Yasuo Abuyama, Kanagawa-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/886,054

(22) Filed: Jun. 22, 2001

(65) Prior Publication Data

US 2001/0054951 A1 Dec. 27, 2001

(30) Foreign Application Priority Data

Jun. 26, 2000 (JP) .................................... P2000-191313

(51) Int. Cl.[7] .................................................. G06K 5/00
(52) U.S. Cl. ....................................... 235/382; 235/487
(58) Field of Search ................................ 235/375, 380, 235/382, 385, 462.01, 487, 492, 493

(56) References Cited

U.S. PATENT DOCUMENTS

| | | | | |
|---|---|---|---|---|
| 5,367,319 A | * | 11/1994 | Graham | 347/2 |
| 5,866,888 A | * | 2/1999 | Bravman et al. | 235/375 |
| 5,987,420 A | * | 11/1999 | Maeda et al. | 705/5 |
| 6,158,658 A | * | 12/2000 | Barclay | 235/384 |
| 6,219,439 B1 | * | 4/2001 | Burger | 235/382 |
| 6,335,688 B1 | * | 1/2002 | Sweatte | 340/573.1 |
| 6,454,173 B2 | * | 9/2002 | Graves | 235/492 |

FOREIGN PATENT DOCUMENTS

| | | | | |
|---|---|---|---|---|
| AU | 1790495 | | 11/1996 | |
| JP | 05035935 | | 6/1993 | |
| WO | WO 9606409 | | 2/1996 | |
| WO | WO 0028484 | | 5/2000 | |
| WO | 00/28484 | * | 5/2000 | G07C/9/00 |
| WO | WO 0028485 | | 5/2000 | |

* cited by examiner

*Primary Examiner*—Daniel St. Cyr
(74) *Attorney, Agent, or Firm*—Pillsbury Winthrop LLP

(57) ABSTRACT

The immigration system includes a travel document insertion port for accepting a travel document retaining individual information which specifies a bearer, a reader for reading individual information from the travel document inserted into the insertion port by a bearer, an acquiring portion for acquiring the bearer's biological information, and a collator for collating the individual information acquired by the acquiring portion with the individual information read from the bearer's travel document by the reader. Further, the system includes an examination portion for examining the passing of a bearer for approval or disapproval based on the result of collation in the collator, a passing ticket issuer for issuing a passing ticket to the bearer who is approved to pass, and a gate for approving the passing of a traveler by accepting the inserted passing ticket issued from the passing ticket issuer.

12 Claims, 6 Drawing Sheets

PASSING EXAMINATION SYSTEM & PASSING EXAMINATION METHOD

This application is based upon and claims the benefit of priority from the prior Japanese Patent Application No. 2000-191313, filed on Jun. 26, 2000; the entire contents of which are incorporated herein by reference.

BACKGROUND OF THE INVENTION

1. Field of the Invention

The present invention relates to a passing examination system and a passing examination method to accept a travel document and examine incoming/outgoing to/from a specific place for approval/disapproval, and open/close a passing gate according to the result of the examination and more particularly to an immigration system and an immigration method for accepting passports and automatically examining the immigration.

2. Description of the Related Art

In the immigration at airports, normally a traveler who desires departure or return to/from overseas submits such a required document as a passport, airline ticket, etc. and an examiner compares a photograph of traveler's face printed on the passport with a traveler himself (herself) and judges the approval or disapproval of the departure or return.

Therefore, skill is required and a work burden on an examiner is large and much time was needed.

On a passport that is a subject for the examination, a photograph of a traveler's face is printed as the biological information of a traveler. In the actual examination, the photograph of a face printed on the passport is compared and judged with a traveler's face visually by an examiner and therefore, there was such a problem that reliability lacks in the examination.

As a method for solving the above problem, for example, Japanese Laid Open Patent Publication (Kokai) No. Hei 5-35935 (laid open on Feb. 12, 1993) disclosed an immigration system. In this system, the immigration is automatically examined according to such a passport that is a portable storage medium not depending on the visual examination by an examiner according to a photograph of a face printed on a passport and an actual traveler's face.

That is, the passport disclosed in Japanese laid Open Patent Publication (Kokai) No. Hei 5-35935 comprises: non-volatile memories each of which is composed of an identification information memory for storing personal checking image information to specify identity of a bearer, a personal confirmation image information memory for storing identification information to confirm the identity with a bearer, and a control information memory for storing control information for immigration control, respectively, a case composed of portable noncombustible material for accommodating the above-mentioned memories and an interface for enabling the data access to the memories from the outside of the case.

Further, the immigration system using the passports comprises: personal confirming means installed at the immigration examination yard for confirming immigrating persons, information reading means installed at the immigration examination yard for reading personal confirming image information, identification information and control information stored in the memory incorporated in the passports, justifiability discriminating means for comparing image information obtained from the personal confirming means with the personal confirming image information read from the information reading means and discriminating justifiability of a passport and its bearer based on the identification information and control information read from the information reading means, control information writing means for writing control information for the immigration control into a control information memory of the passport memory, and a gate that is opened/closed according to the result of discrimination of the justifiability discriminating means.

In the passport and the immigration system, wherein this passport is used, being disclosed in Japanese Laid Open Publication (Kokai) No. Hei 5-35935, it becomes very difficult to modify or alter the passport and it is therefore possible to prevent illegal use of a passport. Further, this system has advantages that waiting times at the immigration examination yard are shortened and the congestion is dissolved.

However, as the immigration gate is opened/closed according to the result of discrimination by the justifiability discrimination means, there are such problems as described below.

That is, if a passport was judged to be not justifiable or a bearer of a passport was not justifiable by the justifiability discriminating means, the gate is not opened. At this time, the bearer of that passport is not able to pass through the gate and has to stand waiting until an examiner comes. While waiting till an examiner arrives, many other passport bearers waiting the examination behind a person who is judged to be not justifiable also have to wait until the problem is solved. Accordingly, a waiting time may not be necessarily shortened.

SUMMARY OF THE INVENTION

The present invention has been made in view of the above circumstances and it is an object to provide a passing examination system and a passing examination method that are capable of automatically examining approval or disapproval of a traveler to pass the gate certainly and making waiting times short.

According to embodiments of the present invention, an immigration system is provided, which is composed of: an insertion port to receive a Travel Document (TD) recording individual information which specifies a bearer; a reader to read individual information from the TD inserted into the insertion port by the bearer; an acquiring portion to acquire biological information of the bearer; a collator to collate the biological information of the bearer acquired by the acquiring portion with the individual information read from the TD of the bearer by the reader; an examination portion to examine the passing of the bearer for approval or disapproval based on the result of collation by the collator; a passing ticket issuer to issue a passing ticket to the bearer who is approved to pass a gate by the examination portion; and a gate to approve the passage by accepting the passing ticket issued by the passing ticket issuer.

DETAILED DESCRIPTION OF THE EMBODIMENTS

Embodiments of the present invention will be described below in detail referring to the attached drawings.

Figure 1:
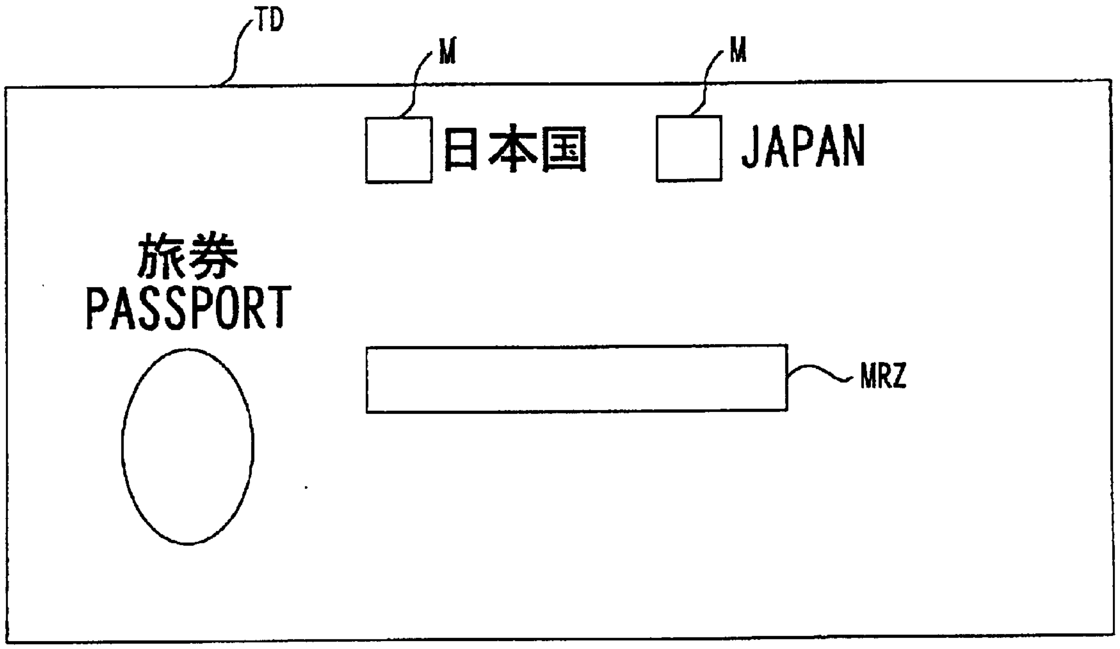
FIG. 1 is a plan view showing Personal Data Page of TD (Travel Document) that is inserted into an immigration system shown in FIG. 2.

As shown in FIG. 1, on the Personal Data Page of a Travel Document (hereinafter referred to as TD) such as a passport/visa, a photograph of a traveler's (a bearer) is printed and a forgery preventing mark M is also printed in the Metameric Print. This Metameric print is a metallic print that has a characteristic to discolor when a TD is forged using a color copy machine.

Further, on the Personal Data Page, there is formed the Machine Readable Zone (hereinafter, simply shown as MRZ) recording individual information in a machine-readable format that is able to specify the TD bearer.

Figure 2:
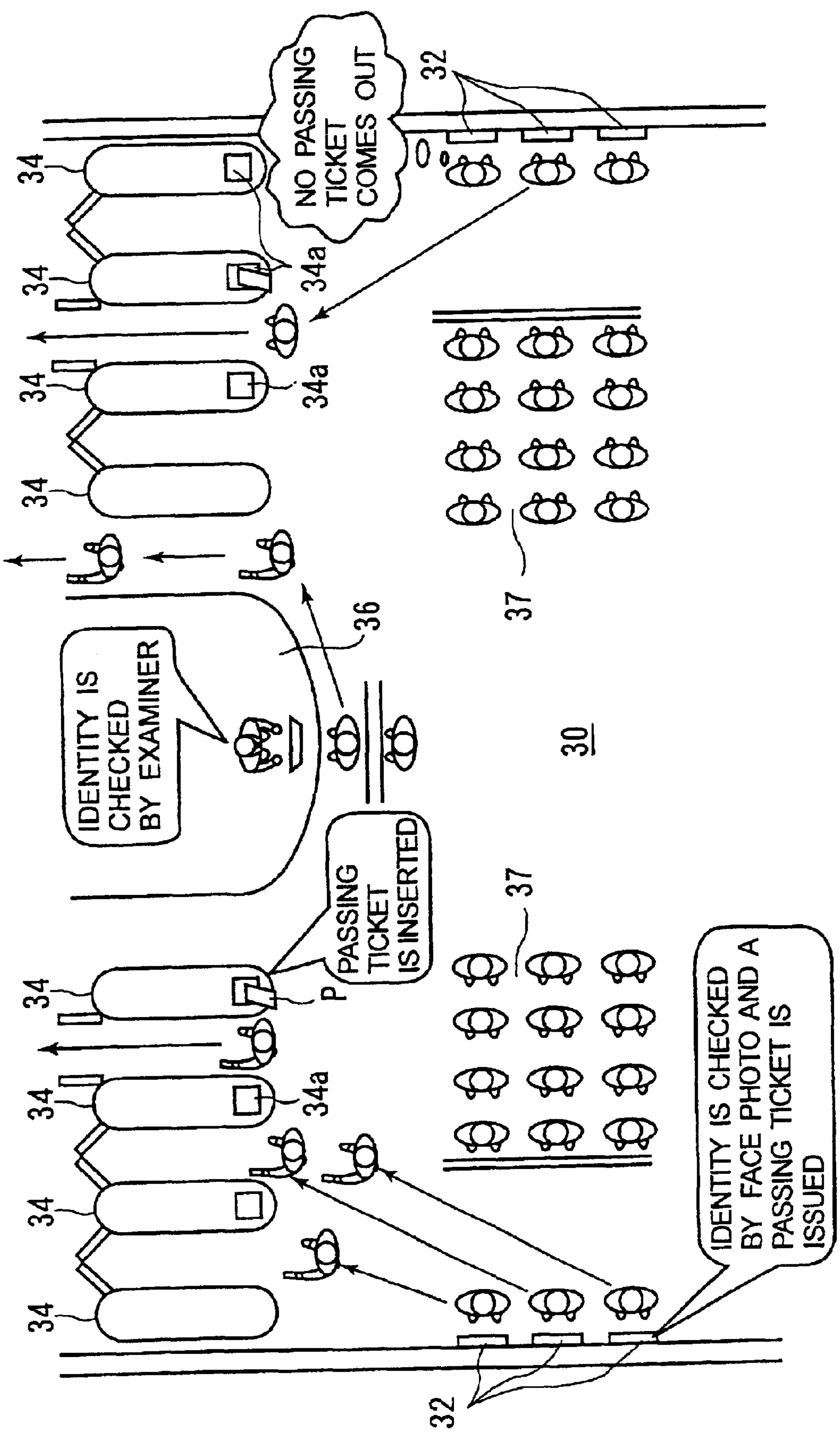
FIG. 2 is a brief plan view showing an embodiment of the immigration system of the present invention.

FIG. 2 shows a diagram for explaining the outline of an immigration system 30.

As shown in FIG. 2, the immigration system 30 has, for instance, 3 units of passing ticket issuer 32 installed on the wall of both sides of a lobby, respectively; total 6 units of the passing ticket issuer 32 are included in the immigration system 30. There are provided waiting spaces 37 in front of passing ticket issuers 32 where travelers stand waiting to get passing tickets.

There is an immigration booth 36 wherein an examiner is present at a further inner place from the locations where plural number of passing ticket issuers 32 are provided. The immigration booth 36 is provided for the examination of travelers who are not obtained passing tickets from the passing ticket issuers 32.

At both sides of the examination booth 36, there are plural number of immigration gates 34 provided with opening/closing plates. Further, the passages at both sides of the immigration booth 36 are not provided with the opening/closing plates. That is, travelers who are approved to depart by the examination by an examiner are able to depart by passing through the gates without proved with the opening/closing plates.

A traveler who is to be examined for departure first inserts a TD into one of plural number of passing ticket issuers 32 of the immigration system 30 and gets a passing ticket P after the examination by the passing ticket issuer.

In the passing ticket issuer 32, a traveler's face photograph printed on the travel document is read and a face picture of the traveler himself (herself) is taken with a camera. Features of the photograph of the traveler's face printed on the travel document are converted into a first face collation data D1. Features of a traveler's face photograph taken by the camera are converted into a second face collation data D. By collating the first face collation data D1 with the second face collation data D2, whether the person is the traveler himself (or herself) is automatically judged.

Further, the passing ticket issuer 32 automatically judges the truth/falsehood of the accepted TD by reading the forgery preventing mark M printed on the Personal Data Page of the TD. At the same time, by reading individual information printed in the MRZ, it is automatically judged whether a traveler is listed on the black list.

Then, a passing ticket P with the collated second face collation data D2 and the individual information printed in a two-dimensional bar code is issued to a traveler who clears all of these judgments.

A traveler who received the passing ticket P issued by the passing ticket issuer 32 inserts the passing ticket P into one of plural immigration gates 34 installed at a location away from the passing ticket issuer 32 and passes through the immigration gate 34. That is, when the examined passing ticket P is inserted into the passing ticket insertion port 34*a* of the immigration gate 34, the opening/closing plates of the immigration gate 34 opens and the departure of the traveler is approved. The passing ticket P inserted into the immigration gate 34 is returned to a traveler who passed the immigration gate 34.

On the other hand, when a traveler whose departure is not approved as the result of the judgment of the departure after inserting a TD into the passing ticket issuer 32, a passing ticket P is not issued and the TD is returned to the traveler. The traveler received the TD submits it to an examiner in the immigration booth 36 and after the examination by the examiner, when the departure is approved; the traveler passes the gate without the opening/closing plates provided.

Further, a traveler returned after departed carrying a returned passing ticket P inserts the passing ticket P into the immigration apparatus 50 (see FIG. 4), which will be described later, and passes an immigration gate 56 provided for each immigration apparatus 50. That is, the immigration apparatus 50 accepts an inserted passing ticket P, reads the face collation data D2 printed on the passing ticket P, converts the face photograph of a traveler himself (herself) into the face collation data D3 and collates two face collation data D2 and D3. Further, the immigration apparatus 50 reads individual information printed on the passing ticket P and judges whether the traveler is listed in the black list. Then, on the condition that two face collation data D2 and D3 are in accord with each other and the traveler is not listed in the black list, the opening/closing plates of the immigration gate open and the traveler is approved to pass the gate.

Figure 3:
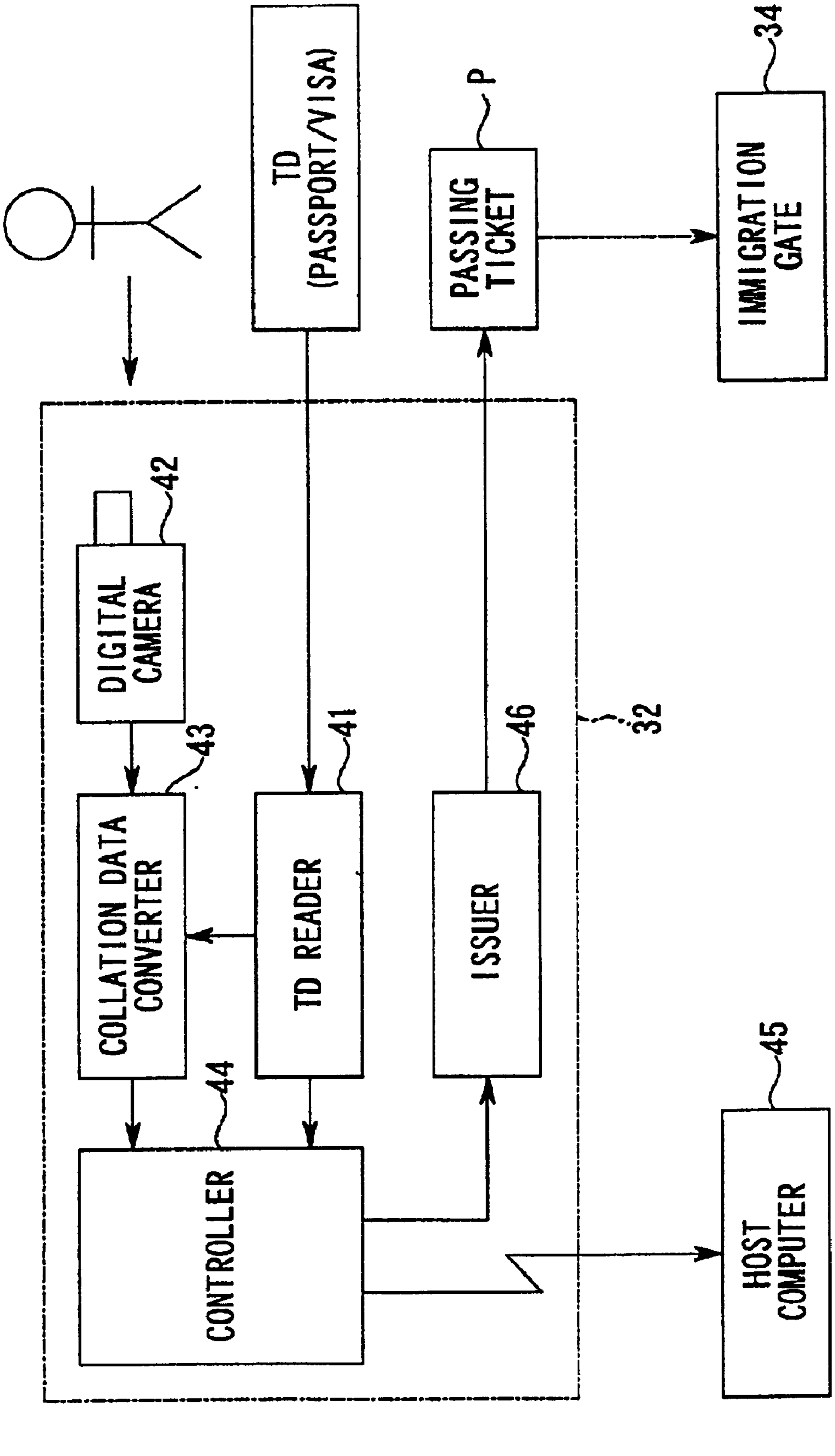
FIG. 3 is a block diagram showing the brief structure of a passing ticket issuer in the immigration system shown in FIG. 2.

The block diagram in FIG. 3 shows the brief structure of the passing ticket issuer 32 described above.

The passing ticket issuer 32 is provided with a TD reader 41 for accepting a TD inserted by a traveler who desires the departure and reading various information annotated on the Personal Data Page of the TD. The face photograph of a traveler himself (herself) is printed on the Personal Data Page of the TD. Further, the forgery preventing mark M is printed in the Metameric print on the Personal Data Page and the MRZ is formed with individual information printed by which a bearer of that TD can be specified. That is, the TD reader 41 in this embodiment is capable of reading such information as a photograph of face, forgery preventing mark M, MRZ, etc.

Further, the passing ticket issuer 32 is equipped with a digital camera 42 for taking a picture of the face of a traveler who inserted a TD and a collation data converter 43 for extracting features of a traveler's face from a picture taken by the digital camera 42 and converting them into a prescribed face collation data D2. The collation data converter 43 extracts features from the information concerning a traveler's face out of the information read through the TD reader 41 and converts the features into a prescribed face collation data D1.

That is, when a TD is inserted into the passing ticket issuer 32, the picture of the face, the forgery preventing mark M and the MRZ are read from the Personal Data Page of the TD by the TD reader 41 and a picture of the face of the traveler who inserted the TD is taken by the digital camera 42. Then, the face image read by the TD reader 41 and the face image photographed by the digital camera are converted into prescribed face collation data D1 and D2, respectively by the collation data converter 43.

The passing ticket issuer 32 has an issuer 46, which issues a passing ticket P to a traveler who is approved to depart as the result of the examination. The issuer 46 issues a passing ticket P by printing the face collation data D2 that is collated by the collation data converter 43 and individual information read from the MRZ of the Personal Data Page of the TD in a two-dimensional bar code.

Further, the passing ticket issuer 32 is equipped with a controller 44 for controlling the entire operation of the passing ticket issuer 32. Firstly, the controller 44 compares and collates two face collation data D1 and D2, which are converted by the collation data converter 43 and under the condition that two face collation data D1 and D2 agree each other, judges that the TD is for the traveler himself (herself) and issues a passing ticket P. A traveler who gets the passing ticket P inserts the passing ticket P into the passing ticket insertion port 34*a* and passes through the immigration gate 34.

Secondly, the controller 44 identifies the color of the forgery preventing mark M read from the Personal Data Page by the TD reader 41 or checks the COL (Character Out Line) of a print pattern of a pre-determined specific character for judging whether the TD was forged. When the controller 44 judges that the TD was forged at this time, the TD is recovered in the passing ticket issuer 32 and no passing ticket P is issued.

Thirdly, the controller 44 inquires the individual information read from the MRZ of the Personal Data Page by the TD reader 41 to the black list contained in the data base (not shown) of a host computer 45, which controls the entirety of the immigration system. When it is found that the individual information is contained in the black list as a result of this inquiry, the departure of that traveler is not approved.

Figure 4:
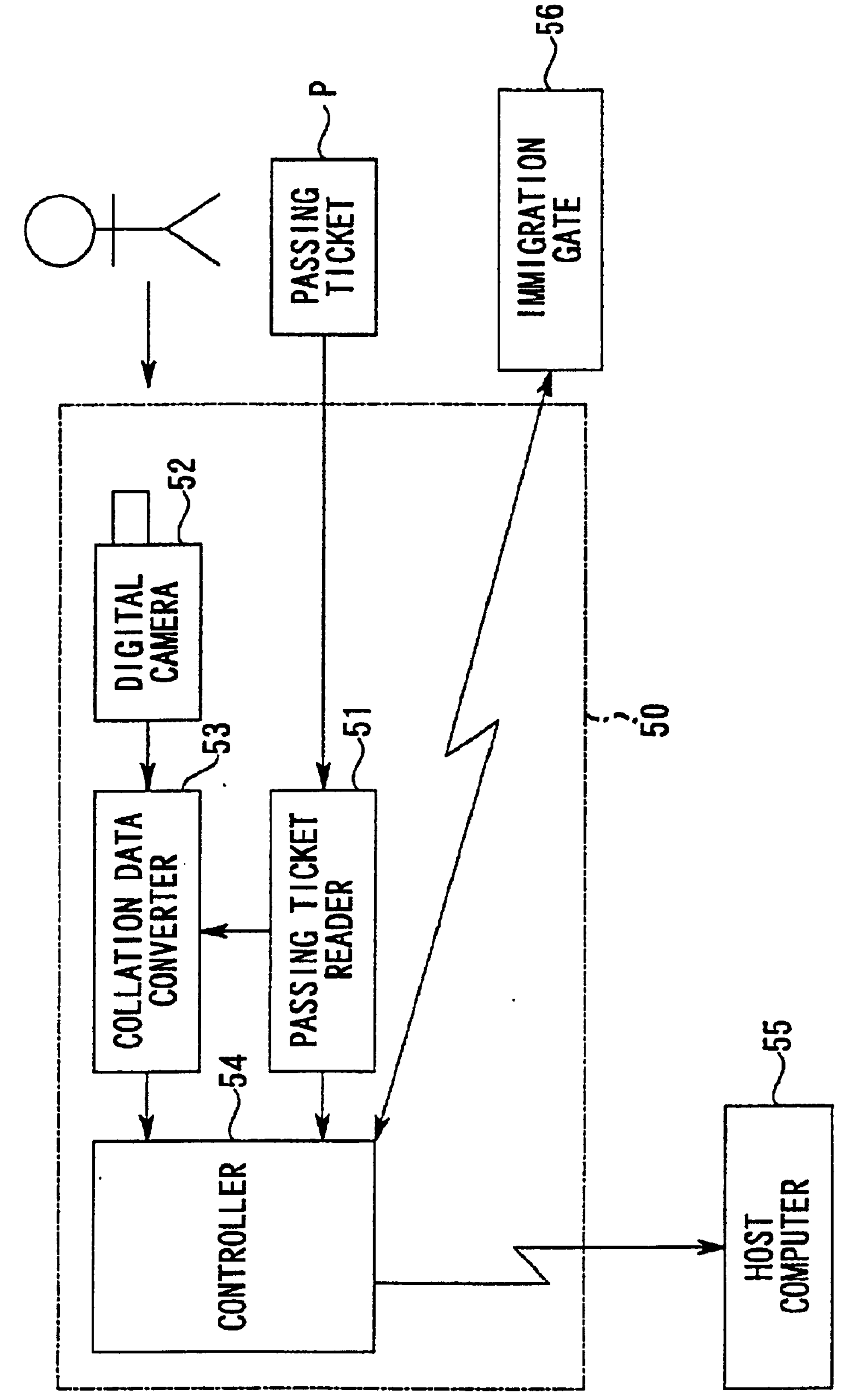
FIG. 4 is a block diagram showing the brief structure of a passing examination apparatus in the immigration system shown in FIG. 2.

The block diagram in FIG. 4 shows the brief structure of an immigration apparatus 50 as a return immigration apparatus.

The immigration apparatus 50 accepts a passing ticket P that is inserted by a traveler who is returned with the passing ticket P that was issued by the passing ticket issuer 32. The immigration apparatus 50 is provided with a passing ticket reader 51 for reading the face collation data D2 and individual information printed on the accepted passing ticket P. Further, the immigration apparatus 50 is also equipped with a digital cameral 52 for taking a picture of a face of a traveler who inserted a passing ticket P and a collation data converter 53 for extracting features of a face image of a traveler taken by the digital camera 52 and converting into a prescribed face collation data D3. When a passing ticket P is inserted into the immigration apparatus 50, the passing ticket reader 51 reads the face collation data D2 and individual information from the passing ticket P. Also, a picture of the face of the traveler who inserted the passing ticket P is taken by the digital camera 52 and converted into the face collation data D3 by the collation data converter 53.

An immigration gate 56 is provided to each immigration apparatus 50. In other words, plural number of immigration apparatus 50 are provided and the immigration gate 56 is provided to each immigration apparatus 50.

Further, the immigration apparatus 50 is equipped with a controller 54 for controlling the entire operation of the immigration apparatus 50. The controller 54 first collates the face collation data D2 read from the passing ticket P by the passing ticket reader 51 with the face collation data D3 as biological information of a traveler himself (herself) acquired by the collation data converter 43. Secondly, the controller 54 inquires the individual information read from the passing ticket P by the passing ticket reader 51 to the black list contained in the data base (not shown) of the host computer 55, which controls the entire immigration system 30. As a result of this inquiry, if the individual information is contained in the black list, the departure of the traveler is disapproved. When two face collation data D2 and D3 are in accord with each other and the traveler is not listed in the black list, the controller 54 opens the immigration gate 56 and approves the passing of the traveler. That is, the entry of the traveler is approved.

Figure 5:
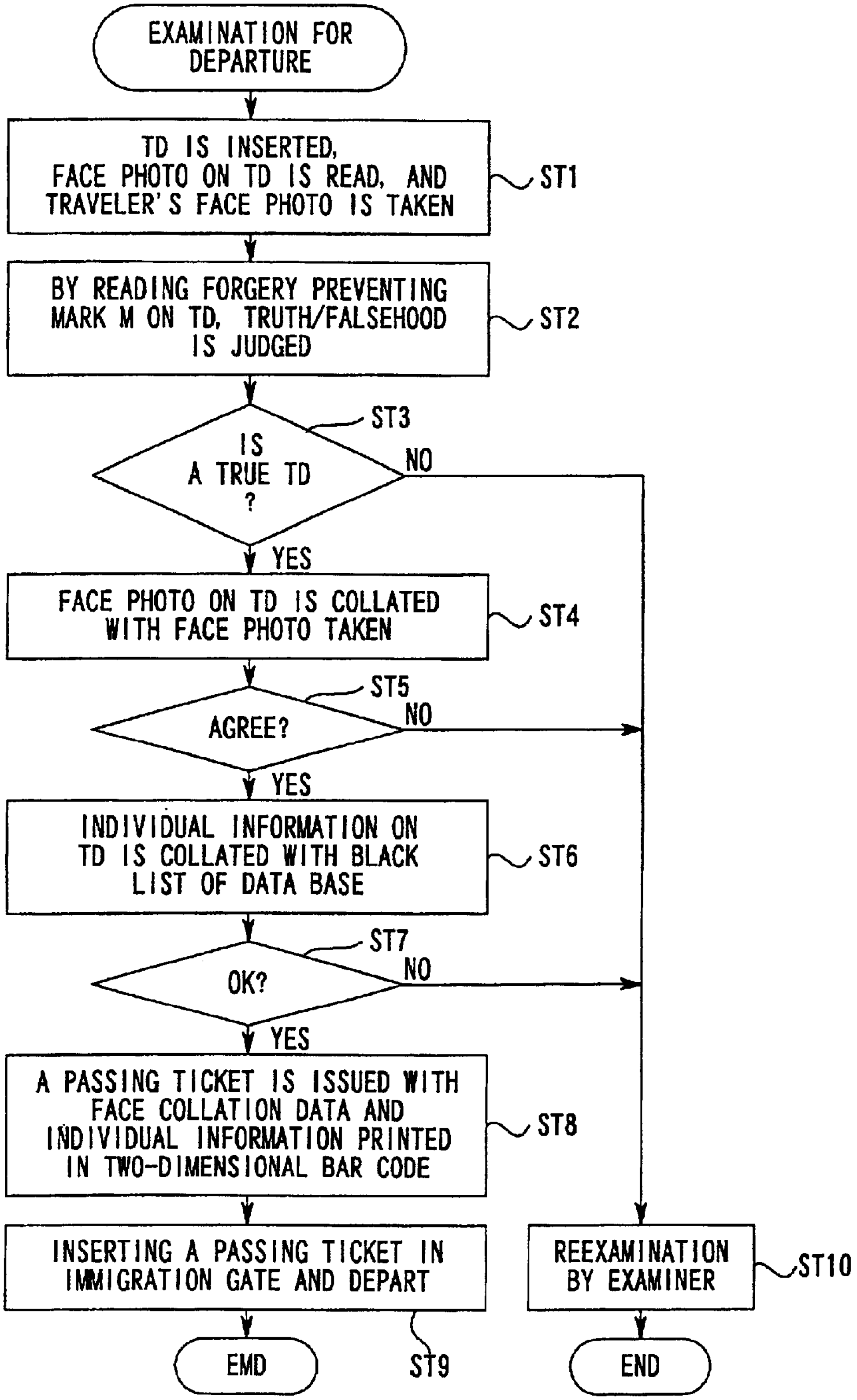
FIG. 5 is a flowchart for explaining the examination of the departure utilizing the passing ticket issuer shown in FIG. 3.

Next, the examination for the departure is explained referring to a flowchart shown in FIG. 5.

First, a TD is inserted into the passing ticket issuer 32 by a traveler who makes an application for the departure examination. In the passing ticket issuer 32, the face picture of a traveler himself (herself) printed on the personal data page of the inserted TD is read by the TD reader 41. At the same time, the traveler's face is photographed by the digital camera 42 and data relative to two face images is input into the collation data converter 43 (ST 1).

Further, the passing ticket issuer 32 reads the forgery preventing mark M printed on the Personal Data Page of the TD by the TD reader 41, checks the presence of discoloration and judges whether the TD is true or false (ST 2).

When it is judged that the inserted TD is a true TD (ST 3: YES) as a result of the judgment in ST 2, the two face images input to the collation data converter 43 in ST 2 are converted into the face collation data D1 and D2, and collated with each other (ST 4).

As a result of the collation in ST 4, when it is judged that two face collation data D1 and D2 agree with each other (ST 5: YES), the individual information read from the MRZ of the Personal Data Page of the TD by the TD reader 41 is inquired to the black list controlled by the host computer 45 (ST 6). That is, it is judged whether the individual information of the traveler is listed in the black list (ST 7).

As a result of the judgment in ST 7, when it is judged that the individual information of the traveler is not listed in the black list (ST 7: YES), a passing ticket P with the face collation data D2 collated in ST 4 and the individual information read in ST 6 printed in a two-dimensional code is issued to the traveler from the issuer 46 (ST 8).

The traveler who received the passing ticket issued in ST 8 inserts the passing ticket P into the passing ticket insertion port 34*a* and passes through the immigration gate 34 (ST 9). At this time, the passing ticket P printed with the face collation data D2 and the individual information is returned to the traveler who passed through the immigration gate 34.

By the way, when the TD is judged not to be a true TD in ST 3 (ST 3: NO), or the face collation data D1 and D2 are not in accord with each other in ST 5 (ST 5: NO) or the individual information of the traveler is judge as being listed in the black list in ST 7 (ST 7: NO), the departure of the traveler is disapproved. As a result, a passing ticket P is not issued to the traveler and the reexamination is made by an examiner (ST 10).

Figure 6:
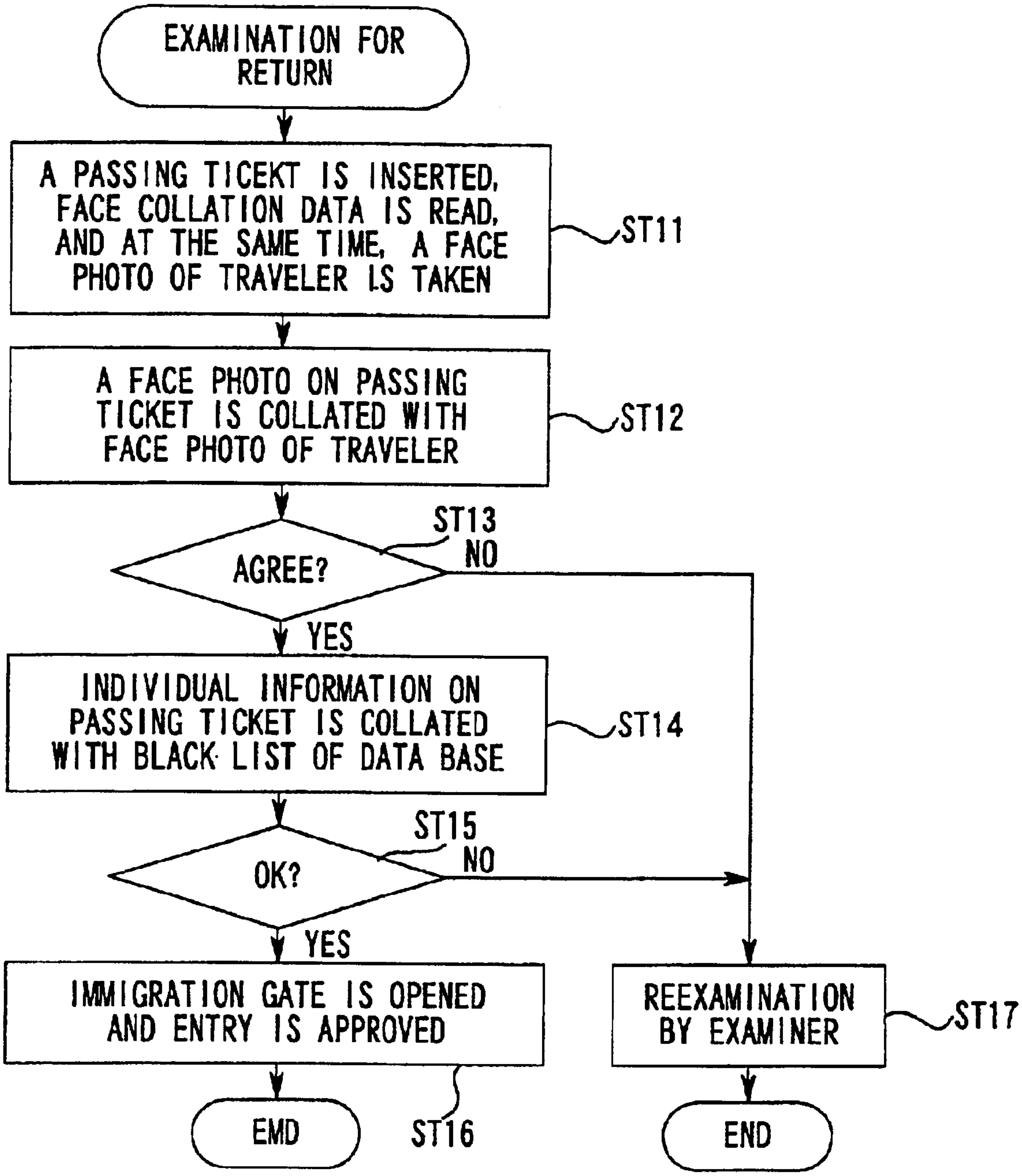
FIG. 6 is a flowchart for explaining the examination of the entry utilizing the examination apparatus shown in FIG. 4.

Next, the examination for entry of a returned traveler is explained referring to a flowchart shown in FIG. 6.

First, the passing ticket P that was returned to a traveler at the time of the examination for the departure is inserted into the immigration apparatus 50 by the traveler. At this time, in the immigration apparatus 50, the face collation data D2 printed on the inserted passing ticket P is read by the passing ticket reader 51. At the same time, the traveler's face is photographed by the digital camera 52 (ST 11). In addition, the individual information printed on the passing ticket P is also read by the passing ticket reader 51 at this time.

Then, the traveler's face image photographed in ST 11 is converted into the face collation data D3 by the collation data converter 53 and this face collation data D3 is compared and collated with the face collation data D2 read from the passing ticket P by the passing ticket reader 51 (ST 12). When two face collation data D2 and D3 are judged as being in accord with each other as a result of the collation in ST 12 (ST 13: YES), the individual information read from the passing ticket P by the passing ticket reader 51 is inquired to the black list controlled by the host computer 55 (ST 14). That is, it is judged whether the individual information of the traveler is listed on the black list (ST 15).

As a result of the judgment in ST 15, when it is judged that the individual information of the traveler is not listed in the black list (ST 15: YES), the opening/closing plates of the immigration gate 56 adjacent to the immigration apparatus 50 is opened and the immigration of the traveler is approved (ST 16).

By the way, if it is judged that two face collation data D2 and D3 are not in accord with each other in ST 13 (ST 13: NO) or the individual information of the traveler is listed in the black list in ST 15 (ST 15: NO), the entry of the traveler is disapproved and the traveler is reexamined by an examiner (ST 17).

As described in the above, according to the immigration system in this embodiment, the advantages shown below are achieved.

That is, the immigration system 30 has the plural number of passing ticket issuers 32 for accepting inserted TDs, automatically examining the immigration for the departure and issuing passing tickets P and the plural number of immigration gates 34 for accepting inserted passing tickets P and approving the passage of travelers at separate locations. Therefore, even when much times are required for the examination at the passing ticket issuers 32 and the immigration examination yard is congested, it is possible to make the immigration examination smoothly without causing the congestion at the immigration gates 34.

Further, in the immigration system 30, biological information such as face collation data D2 and individual information of travelers are printed on passing tickets P in two-dimensional bar codes at the time of the immigration examination for departure, these passing tickets are inserted into the immigration apparatus 50 when travelers are returned, and the face collation data D2 and individual information are read, and it is thus possible to simplify the immigration examination. That is, at the time of the immigration examination for departure, it was necessary to photograph a face picture of TD and convert into the face collation data D2. However, at the time of the immigration examination when returned, it is possible to read the already converted face collation data D2 and therefore, the examination can be made at a high speed and easily.

Further, the present invention is not restricted to the embodiments described above but can be modified variously within its scope. For example, a case wherein information relative to a face image is used as biological information of a traveler is explained in the above embodiments but such information relative to finger print, palm print, iris or DNA of a traveler may be usable.

Further, in the immigration system described above, a passing ticket P is issued to a traveler to pass the immigration gate at the time of the immigration examination. But instead of issuing a passing ticket P, face collation data D and individual information are printed on a TD that was accepted by the passing ticket issuer 32 and a traveler may be examined based on the information printed on this TD at the time of the immigration examination when a traveler is returned. In this case, for example, the IC card function may be incorporated in a TD.

As explained in the above, the passing examination system is in the structure and has actions as described above and therefore, it is possible to automatically examine the passing of a traveler for approval or disapproval and make a waiting time short.

What is claimed is:

1. A passing examination system comprising:

a passing ticket issuer, including:

an insertion port to receive a Travel Document (TD) recording individual information which specifies a bearer;

a reader to read the individual information from the TD and specific information printed on the TD after the TD is inserted into the insertion port by the bearer;

an acquiring portion to acquire biological information of the bearer;

a collator to collate the biological information of the bearer acquired by the acquiring portion with the individual information read from the TD of the bearer by the reader;

an examination portion to examine authenticity of the TD based on the specific information read from the TD by the reader and determine whether to approve the passing of the bearer based on whether the biological information of the bearer and the individual information read from the TD of the bearer are in agreement as a result of collation by the collator;

an issuer to issue a passing ticket to the bearer only when the bearer is approved to pass by the examination portion and to withhold issuance of the passing ticket if the bearer is not approved; and a recovering portion to recover the TD when the examination portion determines that the TD is forged;

a gate, which is installed at a location away from the passing ticket issuer, to approve the passage of the bearer by accepting the passing ticket issued by the passing ticket issuer to the bearer who is approved to pass thereby to prevent the bearer who is not approved from passing the gate without the passing ticket; and an examination booth, provided at a location away from the passing ticket issuer, wherein an examiner examines the bearer to whom the passing ticket is not issued and the bearer's TD.

2. The system according to claim 1, wherein the issuer of the passing ticket issues a passing ticket recording the biological information already collated by the examination portion to the bearer, and the gate accepts the passing ticket inserted by the bearer, approves the passage of the bearer, returns the passing ticket to the bearer who passed the gate, accepts the returned passing ticket inserted again by the bearer, reads the biological information recorded on the passing ticket and approves the passage of the bearer through the gate in the reverse direction.

3. The system according to claim 1, wherein the TD records at least one of a forgery preventing mark having a prescribed color and a print pattern of a pre-determined specific character thereon, the passing ticket issuer further includes means for identifying the prescribed color of the at least one of a forgery preventing mark and the print pattern of the pre-determined specific character recorded on the TD to determine whether the TD is forged, and the recovering portion recovers the TD when the identifying means determines that the TD is forged.

4. A passing examination system comprising:

a passing ticket issuer, including:

an insertion port to receive a Travel Document (TD) recording individual information which specifies a bearer;

a reader to read the individual information from the TD and specific information printed on the TD after the TD is inserted into the insertion port by the bearer;

a first acquiring portion to acquire biological information of the bearer;

a first collator to collate the biological information of the bearer acquired by the first acquiring portion with the individual information read from the TD of the bearer by the reader;

a first examination portion to examine authenticity of the TD based on the specific information read from the TD by the reader and determine whether to approve the passing of the bearer based on whether the biological information of the bearer and the individual information read from the TD of the bearer are in agreement as a result of collation by the first collator;

an issuer to issue a passing ticket recording the biological information that has been collated by the first collator to the bearer only when the bearer is approved to pass by the first examination portion and to withhold issuance of the passing ticket if the bearer is not approved; and a recovering portion to recover the TD when the examination portion determines that the TD is forged;

a first gate, which is installed at a location away from the passing ticket issuer, to accept an inserted passing ticket issued to the bearer who is approved to pass by the passing ticket issuer, approving the passage of the bearer in a first direction and returning the accepted passing ticket to the bearer thereby to prevent the bearer who is not approved from passing the gate without the passing ticket;

an examination booth, provided at a location away from the passing ticket issuer, wherein an examiner examines the bearer to whom the passing ticket is not issued and the bear's TD; and an immigration apparatus, including:

a passing ticket insertion port to accept the passing ticket inserted by the bearer when the bearer moves in a second direction opposite to the first direction after the bearer passes the first gate in the first direction;

a passing ticket reader to read the biological information from the passing ticket inserted into the passing ticket insertion port by the bearer;

a second acquiring portion to acquire biological information of the bearer;

a second collator to collate the biological information of the bearer acquired by the second acquiring portion with the biological information read from the passing ticket by the passing ticket reader;

a second examination portion to approve the passage of the bearer based on whether the biological information of the bearer and the biological information read from the passing ticket are in agreement as a result of collation by the second collator; and a second gate to permit the passage of the bearer in the second direction based on the approval of the passage of the bearer by the second examination portion.

5. The system according to claim 4, wherein the TD records at least one of a forgery preventing mark having a prescribed color and a print pattern of a pre-determined specific character thereon, the passing ticket issuer further includes means for identifying the prescribed color of the at least one of a forgery preventing mark and the print pattern of the pre-determined specific character recorded on the TD to determine whether the TD is forged, and the recovering portion recovers the TD when the identifying means determines that the TD is forged.

6. A passing examination method, comprising:

accepting a TD, which is inserted an insertion portion of a passing ticket issuer, the TD containing individual information specifying a bearer of the TD;

reading the individual information from the TD and specific information printed on the TD after the TD is inserted into the insertion portion by the bearer;

acquiring biological information of the bearer;

collating the acquired biological information of the bearer with the individual information read from the TD of the bearer;

examining authenticity of the TD based on the specific information read from the TD and determining whether to approve the passing of the bearer based on whether the biological information of the bearer and the individual information read from the TD of the bearer are in agreement as a result of the collating;

issuing a passing ticket to the bearer only when the bearer is approved to pass an immigration gate in the examining and to withhold issuance of the passing ticket if the bearer is not approved;

recovering the TD when the examining determines that the TD is forged;

approving the passage of the bearer by accepting the inserted passing ticket thereby to prevent the bearer who is not approved from passing the gate without the passing ticket; and examining, by an examiner in an examination booth located away from the passing ticket issuer, the bearer to whom the passing ticket is not issued and the bear's TD.

7. The method according to claim 6, wherein the issuing of the passing ticket includes issuing a passing ticket which records the biological information that has been collated during the examination, and upon accepting the passing ticket inserted by the bearer, the passing of the bearer is approved, the passing ticket is returned to the bearer, the passing ticket inserted again by the bearer is accepted, the biological information recorded on the passing ticket is read, and the passing of the bearer in an opposite direction is approved in the approving.

8. A passing examination method, comprising:

accepting a TD, which is inserted in an insertion portion of a passing ticket issuer, the TD recording individual information specifying a bearer of the TD;

reading the individual information from the TD and specific information printed on the TD, wherein the TD is inserted into the insertion port by the bearer;

acquiring biological information of the bearer;

collating the acquired biological information of the bearer with the individual information read from the TD;

examining authenticity of the TD based on the specific information read from the TD and determining whether to approve the passing of the bearer based on whether the biological information of the bearer and the individual information read from the TD of the bearer are in agreement as a result of the collating;

issuing a passing ticket recording the collated biological information to the bearer only when the bearer is approved to pass a gate in the examining and to withhold issuance of the passing ticket if the bearer is not approved;

recovering the TD into the passing ticket issuer when the examining determines that the TD is forged;

approving the bearer to pass the first gate in a first direction by accepting the passing ticket after the passing ticket is inserted into the first gate by the bearer who is approved to pass and returning the accepted passing ticket to the bearer from the first gate thereby to prevent the bearer who is not approved from passing the first gate without the passing ticket;

examining, by an examiner in an examination booth located away from the passing ticket issuer, the bearer to whom the passing ticket is not issued and the bearer's TD;

accepting the passing ticket after the returned passing ticket is inserted into a second gate when the bearer moves in a second direction opposite to the first direction after the bearer passes in the first direction;

reading the biological information recorded on the passing ticket that is inserted into the second gate by the bearer;

acquiring the bearer's biological information;

collating the acquired bearer's biological information with the biological information read from the passing ticket;

examining whether to approve the passing of the bearer based on whether the acquired bearer's biological information and the biological information read from the passing ticket are in agreement as a result of the collating; and approving the bearer to pass the second gate in the second direction.

9. A passing examination system comprising:

a passing ticket issuer including:

an insertion port to receive a Travel Document (TD) recording individual information which specifies a bearer, a reader to read the individual information from the TD and specific information printed on the TD after the TD is inserted into the insertion port by the bearer, an acquiring portion to acquire biological information of the bearer, a collator to collate the biological information of the bearer acquired by the acquiring portion with the individual information read from the TD of the bearer by the reader, an examination portion to examine the authenticity of the TD based on the specific information read from the TD by the reader and whether to approve the passing of the bearer based on whether the biological information of the bearer and the individual information read from the TD of the bearer are in agreement as a result of collation by the collator, an issuer to issue a passing ticket to the bearer only when the bearer is approved to pass by the examination portion and to withhold issuance of the passing ticket if the bearer is not approved, and a recovering portion to recover the TD when the examination portion determines that the TD is not authentic, and a data base pre-recording individual information of a bearer whose passing is to be rejected, wherein the collator queries the data base as to the individual information read by the reader and the examination portion disapproves the passing of the bearer when the individual information exists in the data base as a result of the query;

a gate, installed at a location away from the passing ticket issuer, to approve the passage of the bearer by accepting the passing ticket issued by the passing ticket issuer to the bearer who is approved to pass thereby to prevent the bearer who is disapproved from passing the gate without the passing ticket; and an examination booth, provided at a location away from the passing ticket issuer, wherein an examiner examines the bearer to whom the passing ticket is not issued.

10. The system according to claim 9, wherein the TD records at least one of a forgery preventing mark having a prescribed color and a print pattern of a pre-determined specific character thereon, the passing ticket issuer further includes means for identifying the prescribed color of the at least one of a forgery preventing mark and the print pattern of the pre-determined specific character recorded on the TD to determine whether the TD is forged, and the recovering portion recovers the TD when the identifying means determines that the TD is forged.

11. A passing examination system comprising:

a passing ticket issuer, including:

an insertion port to receive a Travel Document (TD) recording individual information which specifies a bearer, a reader to read the individual information from the TD and specific information printed on the TD after the TD is inserted into the insertion port by the bearer, a first acquiring portion to acquire biological information of the bearer, a first collator to collate the biological information of the bearer acquired by the first acquiring portion with the individual information read from the TD of the bearer by the reader, a first examination portion to examine the authenticity of the TD based on the specific information read from the TD by the reader and determine whether to approve the passing of the bearer based on whether the biological information of the bearer and the individual information read from the TD of the bearer are in agreement as a result of collation by the first collator, an issuer to issue a passing ticket recording the biological information that has been collated by the first collator to the bearer only when the bearer is approved to pass by the first examination portion and to withhold issuance of the passing ticket if the bearer is not approved, a recovering portion to recover the TD when the examination portion determines that the TD is forged, and a data base pre-recording individual information of a bearer whose passing is to be rejected, wherein the collator queries the data base as to the individual information read by the reader and the examination portion disapproves the passing of the bearer when the individual information exists in the data base as a result of the query;

a first gate, installed at a location away from the passing ticket issuer, to accept an inserted passing ticket issued to the bearer who is approved to pass by the passing ticket, approving the passage of the bearer in a first direction and returning the accepted passing ticket to the bearer thereby to prevent the bearer who is not approved from passing the gate without the passing ticket;

an examination booth, which is provided at a location away from the passing ticket issuer and wherein an examiner examines the bearer to whom the passing ticket is not issued and his or her TD;

an immigration apparatus, including:

a passing ticket insertion port to accept the passing ticket inserted by the bearer when the bearer moves in a second direction opposite to the first direction after the bearer passes the first gate in the first direction, a passing ticket reader to read the biological information from the passing ticket inserted into the passing ticket insertion port by the bearer, a second collator to collate the biological information of the bearer acquired by the second acquiring portion with the biological information read from the passing ticket by the passing ticket reader, and a second examination portion to approve the passage of the bearer based on whether the biological information of the bearer and the individual information read from the TD of the bearer are in agreement as a result of collation by the second collator; and a second gate to permit the passage of the bearer in the second direction based on the approval of the passage of the bearer by the second examination portion.

12. The system according to claim 11, wherein the TD records at least one of a forgery preventing mark having a prescribed color and a print pattern of a pre-determined specific character thereon, the passing ticket issuer further includes means for identifying the prescribed color of the at least one of a forgery preventing mark and the print pattern of the pre-determined specific character recorded on the TD to determine whether the TD is forged, and the recovering portion recovers the TD when the identifying means determines that the TD is forged.

* * * * *